Jan. 2, 1934.  H. TYLER  1,942,039
WIND SIGNAL
Filed Sept. 3, 1929
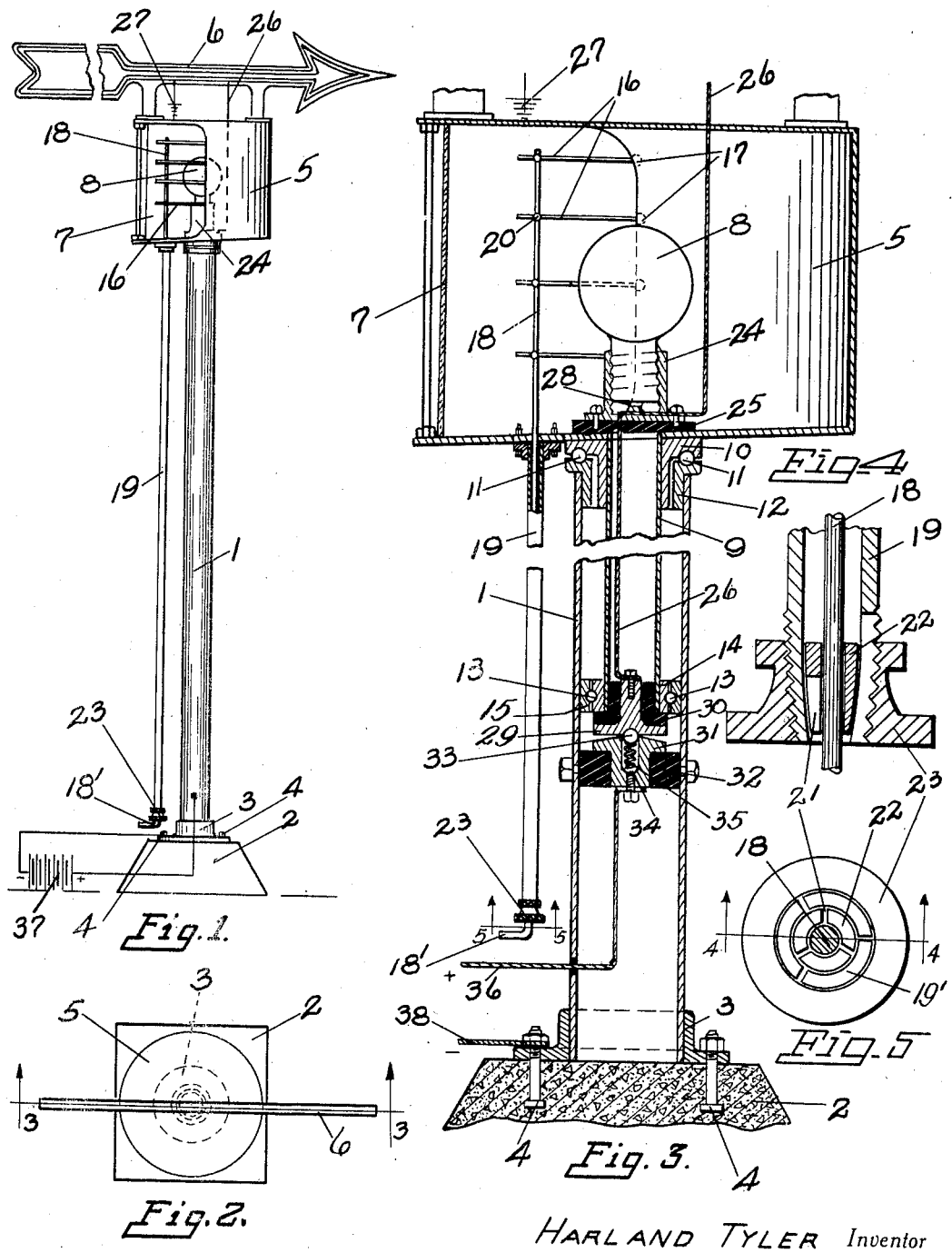
HARLAND TYLER Inventor
By Herbert E. Smith
Attorney Patented Jan. 2, 1934

1,942,039

UNITED STATES PATENT OFFICE 1,942,039

WIND SIGNAL

Harland Tyler, Dayton, Wash.

Application September 3, 1929. Serial No. 390,001

1 Claim. (Cl. 73—55)

My present invention relates to an improved wind signal or direction indicator for use at airports, flying fields, and other places where there is a necessity for knowledge of which direction the wind is blowing. The signal is illuminated, and is therefore visible at night, as well as in daylight.

The signal is electrically illumined, and is rotatable in order that it may change position as the direction of the wind changes, an arrow being used as a weather-vane to insure the required veering of the signal with the wind currents.

The primary object of my invention is the provision of a compactly arranged appliance of this character which is comparatively inexpensive in cost of production and maintenance, which is automatic and reliable in the performance of its functions, and which is strong and sufficiently durable to withstand wind pressures.

The invention consists in certain novel combinations and arrangements of parts as will hereinafter be more fully set forth and claimed. In the accompanying drawing I have illustrated one complete example of the physical embodiment of my invention wherein the parts are combined and arranged according to the best mode I have thus far devised for the practical application of the principles of my invention.

Figure 1 is a view in elevation of a wind signal embodying my invention. Figure 2 is a top plan view of the appliance. Figure 3 is a vertical sectional view at line 3—3 Figure 2. Figure 4 is a sectional detail view of the clamp for the adjustable reflectors. Figure 5 is an enlarged transverse sectional view as at line 5—5 of Figure 3.

In carrying out my invention I utilize a fixed pedestal or tubular column 1 which is of adequate height to insure visibility of the signal at required height, and is firmly anchored to a concrete or other base 2 by means of the base ring 3 and bolts 4.

The signal at the top of the column comprises a cylindrical head or housing 5 on the top of which the direction indicator or arrow 6 is firmly mounted, and this arrow veers with the wind as a weather vane, carrying with it the lamp-head or housing 5, with the changes in the direction of the wind. The inner surface of the front wall of the housing or signal head forms a concave reflecting surface, and a lens 7, of semi-cylindrical shape complementary to the front wall of the housing, distributes the light rays reflected from the electric lamp 8, mounted centrally within the housing between the reflector and the lens. The front of the housing is thus closed to passage of light rays, while the lens at the rear of the housing, under the tail of the weather vane 6 permits a light beam to be projected from the housing on a line parallel with the plane of the weather vane, or arrow 6.

The lamp is mounted above the upper end of the lamp post 9, which is a tubular structure rigid with the housing or signal head and projects downwardly into the tubular-column or pedestal a sufficient distance to insure proper support for the signal head and also the required freedom of the signal head in turning as the direction of the wind varies.

A flanged bearing ring 10 rigidly joins the top of the tubular lamp post with the bottom of the housing, and bearing balls 11 support the signal head and its post at the top of a fixed ball-race or flanged ring 12 secured at the top of the tubular column. A second and lower ball bearing is provided for the lamp post and its head at the lower end of the post, said ball bearing being indicated as 13 interposed between the bearing ring 14 on the exterior of the tubular post and the complementary ring 15 on the interior of the column.

Within the lamp housing are arranged a vertical series of horizontally disposed, adjustable, reflector-plates 16 having reflecting surfaces related to the electric lamp 8, and these reflector plates, which are hinged at 17 to the casing opposite the lamp, are adjustable to deflect the light rays emanating from the lamp upwardly or downwardly through the lens. For adjusting the reflector plates, a lever-rod 18, having a handle 18' at its lower end, and movable in a tubular guide 19 secured to the bottom of the lamp housing, is employed. The lever-rod projects upwardly into the rear portion of the lamp housing and is pivotally connected, as at 20, to the several reflector plates, the handle end 18' of the lever rod being in position where it is accessible for use when required.

At its lower end the tubular guide for the lever rod is threaded, and split to form resilient tongues 19', and a tapered collar which is split at 21 to form resilient tongues 22, is mounted on the rod within the split end of the guide. A nut 23 on the threaded split end of the guide is used to clamp the end of the guide on the tapered collar, and the latter is clamped on the lever rod after the rod has been adjusted.

The lamp is mounted in a socket 24 fixed to an insulating block 25 secured within the housing at the top of the lamp post, and the light wire 26 that supplies the lamp 8 also extends to the arrow or illuminated signal 6 for purposes of illumination. This illuminated signal may be of the Neon gas tube type, or of any other type of electrically illuminated signal for the purpose of an indicator. The light circuit is grounded at 27 from the signal 6 to the lamp housing, and the lamp 8 has electrical contact in the circuit at 28. Below the lamp 8 the wire 26 passes through the post 9 and is secured to a conductor 29 that is supported in an insulated ring 30 fixed within the lower bearing end of the lamp post.

The conductor 29, of course, moves with the lamp post and lamp and a complementary, fixed, conductor 31 beneath the movable conductor, is vertically alined therewith and rigidly supported in an insulated ring 32 which is firmly fixed within the interior of the tubular column.

The movable conductor and the fixed conductor are not in frictional contact, but a connector 33, in the form of a sphere or ball is employed to insure at all times electrical contact between the two conductors. The connector is located at the upper end of a recess 34 in the lower conductor, and a resilient support for the connector is provided by use of a spring 35 in the recess, below the connector, and the spring holds the connector or ball in contact with the upper conductor at all times. The two conductors are fashioned with circular flanges or disks that form heads, and the ball, spring, and walls of the lower recessed conductor provide the necessary frictional contact for passage of the current of the lighting circuit for the lamp and signal.

The lighting circuit is completed from the lower conductor by wire 36 to the positive side of a battery 37, and the wire 38 secured to the tubular column, or to one of the bolts 4 of the column, extends to the negative side of the battery, as indicated. A usual type of switch is interposed in the lighting circuit for controlling the illumination of both the lamp 8 and the signal 6, and other necessary accessories, although not shown are of course employed.

Having thus fully described my invention, what I claim as new and desire to secure by Letters Patent is:

The combination in a rotatable wind signal, of a rotatable post, a housing mounted on the post and a lamp in the housing, a wind vane mounted on the top of the housing, a rear light transmitting lens in the housing, a vertical series of hinged and substantially horizontally disposed reflector-plates arranged adjacent the lamp, a vertically reciprocable adjusting rod having a handle at its lower end and extending upwardly into the housing, pivotal connections between said rod and plates, a tubular guide for the rod attached at the bottom of the housing, said guide having a split resilient lower end above the rod-handle, a split resilient collar on the rod within said lower end of the guide, and a clamp nut threaded on the lower end of the guide, whereby the lower end of the guide and the collar may be clamped on the rod to hold the latter and the reflector-plates in adjusted position.

HARLAND TYLER.